United States Patent [19]

Bright et al.

[11] Patent Number: 4,622,001
[45] Date of Patent: Nov. 11, 1986

[54] CAVITY COOLING SYSTEM

[75] Inventors: Stephen A. Bright, Troy; Philip L. Brun, Dayton; Mark C. Bercot, Piqua; Larry A. Beres, Tipp City; Jerry A. Brackney, Dayton; Timothy L. Bright, Greenville; David C. Hockaday, Wilmington; Jeffrey L. Patrick, Dayton, all of Ohio

[73] Assignee: Electra Form, Inc., Vandalia, Ohio

[21] Appl. No.: 711,030

[22] Filed: Mar. 12, 1985

[51] Int. Cl.$^4$ .......................................... B29C 45/72
[52] U.S. Cl. .................................. 425/549; 425/552
[58] Field of Search ...................... 425/542, 547–549, 425/562, 567, 568

[56] References Cited

U.S. PATENT DOCUMENTS

| | | | |
|---|---|---|---|
| 2,828,509 | 4/1958 | Smucker et al. | 425/552 |
| 3,488,810 | 1/1970 | Gellert | 425/567 |
| 4,306,852 | 12/1981 | Mateev et al. | 425/549 |
| 4,345,892 | 8/1982 | Schulte et al. | 425/568 |
| 4,517,453 | 5/1985 | Tsutsumi | 425/549 |
| 4,521,179 | 6/1985 | Gellert | 425/549 |
| 4,530,654 | 7/1985 | Rose | 425/548 |

OTHER PUBLICATIONS

*Plastics Mold Engineering;* Dubois, J. H., 1965, p. 419.

Primary Examiner—Jay H. Woo
Assistant Examiner—J. Fortenberry
Attorney, Agent, or Firm—Barnes & Thornburg

[57] ABSTRACT

A cavity member is disclosed for use in an injection molding machine. The cavity member has one portion which includes a molding surface for forming the molded article and a second portion for reducing heat transmission to the first portion. The second portion forms a cap on the nozzle end of the cavity member and includes an aperture aligned with the gate of the cavity member so as to permit plastic from the nozzle of an injection molding machine to enter into the mold. The cap includes channels which can cooperate with pockets in the nozzle end of the second portion for liquid cooling. The nozzle is spaced from the cap by a short distance to provide a thermal break which break can be filled with plastic from the injection molding unit to provide further insulation.

20 Claims, 5 Drawing Figures

CAVITY COOLING SYSTEM

The present invention is directed generally to improvements in injection molding machines and specifically to improvements in the design of cavity members to decrease the thermal transmission between the heated injection nozzle and the molding cavity.

Conventional injection molding machines include a source of molten plastic which generally consists of a plasticating and injection unit which directs the molten plastic to the mold by way of a nozzle assembly. A typical nozzle assembly includes a heater to ensure that the plastic is maintained in its molten state as it is delivered from the plasticating and injection unit. The nozzle assembly may be physically separated from the plasticating and injection unit by an intermediate manifold system of varying design, which manifold system is also generally heated. Plastic within the plasticating and injection unit is subjected to mechanical working and thermal conditioning to a point that it can flow under an applied pressure through the nozzle assembly into a mold to form a desired article.

The mold which receives the plastic typically comprises a pair of mold members commonly referred to as the core element and the cavity element which generally form a male and female portion of the mold, respectively. The mold members are usually mounted such that one member is reciprocally movable with respect to the other by means of a clamping system. The clamping system provides the necessary compressional forces to permit formation of the article being molded during injection. The clamping system also provides the necessary mechanisms for opening the mold subseuent to article formation, ejection of the article molded, and closing of the mold in preparation for injection of the next subsequent article.

The length of time between sequential ejection of molded articles is commonly referred to as the cycle time. In general, it is desirable to reduce the cycle time as far as possible consistent with satisfactory article formation so as to achieve maximum output of the molding machine. Many factors are involved in determining the minimum practical cycle time for any given molded article. Some of the factors involved are the required recovery time for the plasticating and injection unit, the volume of plastics actually delivered from the injection unit to the mold with each cycle, the cooling time required to achieve satisfactory article definition within the mold, and other factors well known in the trade.

The injection molding of polyethylene terephthalate (PET) to achieve articles having negligible crystallinity so as to be suitable for subsequent stress orientation is particularly difficult. It is necessary to render the PET molten in the plasticating and injection unit at a temperature above about 275° C. Upon injection of the PET into the mold, it is necessary that the plastic be cooled very quickly to a temperature less than 100° C. so as to avoid the range of maximum crystallite growth. This undesirable range extends from about 120° C. to about 250° C., the rate of crystallization increasing dramatically between 140° C. and 180° C. To avoid this crystallite growth, the mold is typically cooled with the aid of a chilled heat transfer liquid circulated around the mold, the temperature of the heat transfer liquid being maintained less than about 16° C. and preferably less than about 10° C.

The chilled heat transfer or cooling liquid is conventionally circulated around the outside of the cavity member and may be introduced into a fountain on the interior of the core member. While conventional cooling schemes are generally satisfactory for molding of certain articles such as bottle parisons having a convex bottom, the formation of other articles having nearly planar or concave bottoms introduces new problems in cooling not previously appreciated, particularly where extremely short cycle times are desired. It is therefore the object of the present invention to provide enhanced cooling for the cavity member of a mold while providing enhanced insulation between that cavity element and an adjacent heated nozzle supplying that cavity element with molten plastics, particularly PET.

In accordance with the present invention, a two-element cavity member is employed. The cavity member includes a first element having an inside surface of the desired shape for cooperating with a core member to define the molding space into which the molten plastic is introduced by way of a gate from the nozzle. A second element is situated between the nozzle and the first element, the second element having an aperture aligned with the gate. The second element includes a surface adjacent the first element which defines a channel between the first and second elements for receiving liquid from the chilled liquid cooling unit. The second element preferably consists of a material having a thermal conductivity of less than about 20 W/m°C. such as stainless steel. The second element includes an outside surface which is dimensioned so as to be spaced from the heated nozzle by a preselected distance so as to provide a thermal break between the nozzle and the second element. The thermal break can be filled with plastic introduced from the plasticating unit upon initiation of the first molding cycle. The layer of plastic therein introduced forms an insulating layer between the nozzle and the second element or cap.

The channel between the first and second element preferably includes a plurality of tortuous slots in the second element and a plurality of pockets in the first element which are connected by the tortuous slots. The pockets in the first element are preferably situated wholly within the maximum diameter of the article-forming surface of the cavity member. The surface of the second element adjacent the first element includes a plurality of lands abutting the first element to provide support for the end surface of the article-forming cavity nearest the injection nozzle.

The cavity member of the present invention achieves a quick heat transfer from the molten plastic to the cooling liquid, particularly in the region adjacent to the nozzle and gate of the cavity member, thereby enabling cycle times to be significantly reduced. The cap member of the present cavity design further acts as an insulating barrier reducing thermal conductivity from the heated injection nozzle to the mold cavity, thereby further reducing the amount of cooling time required to achieve a form stable state of the article being molded. Additionally, the layer of plastic introduced into the thermal break between the nozzle and cap operates as yet another insulating layer which reduces the transmission of heat from the nozzle to the mold cavity.

Additional features and advantages of the invention will become apparent to those skilled in the art upon consideration of the following detailed description of preferred embodiments exemplifying the best mode of carrying out the invention as presently perceived. The detailed description particularly refers to the accompanying figures.

Figure 1:
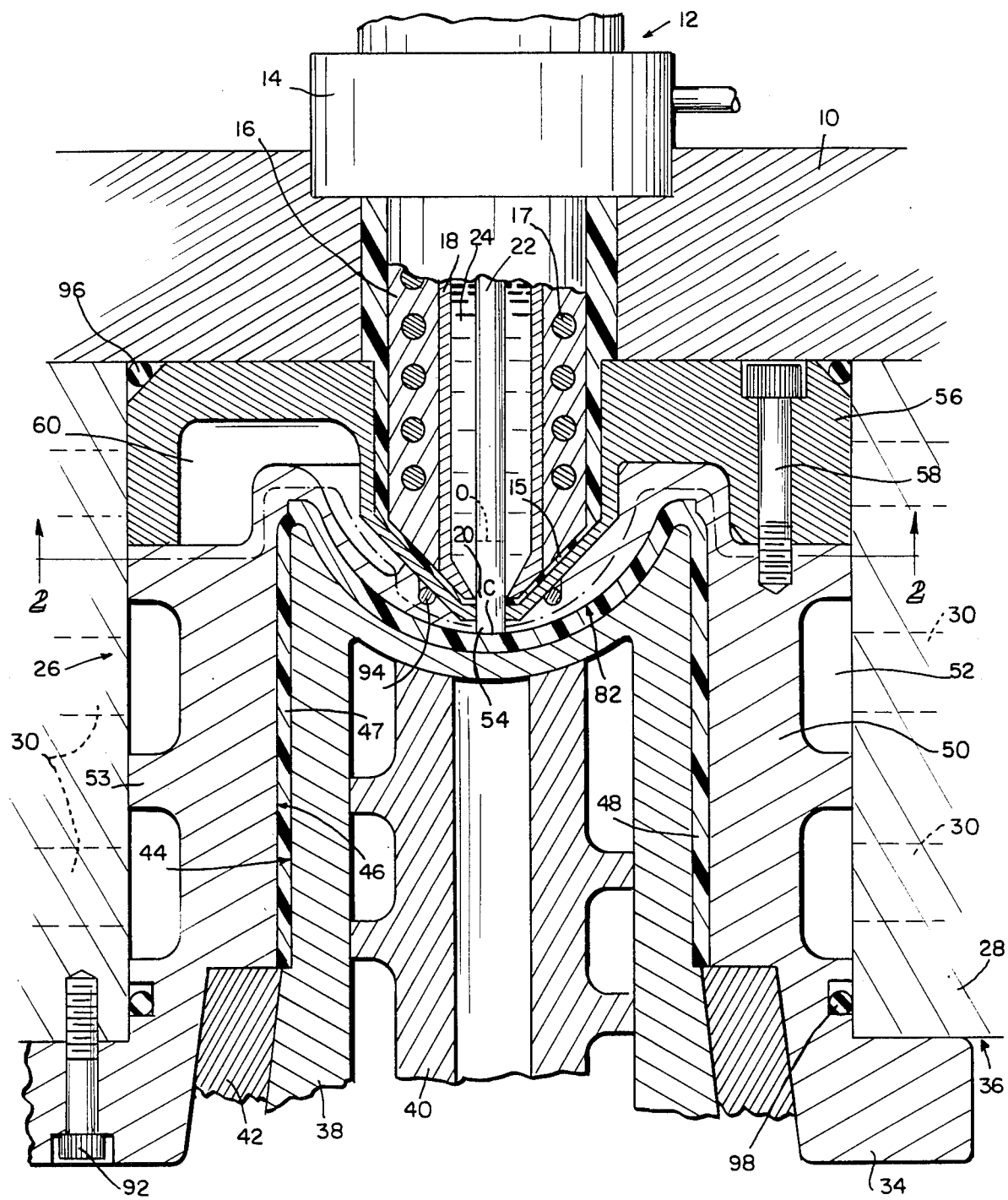
FIG. 1 is a sectional view of an injection mold in accordance with the present invention.
Figure 2:
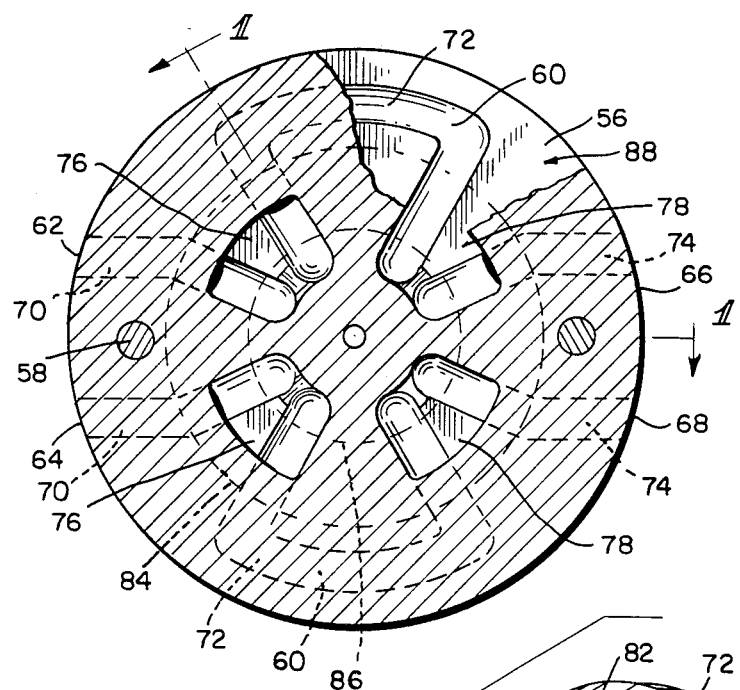
FIG. 2 is a sectional view of the two-element cavity shown in FIG. 1 taken along lines 2—2 and partly broken away.
Figure 4:
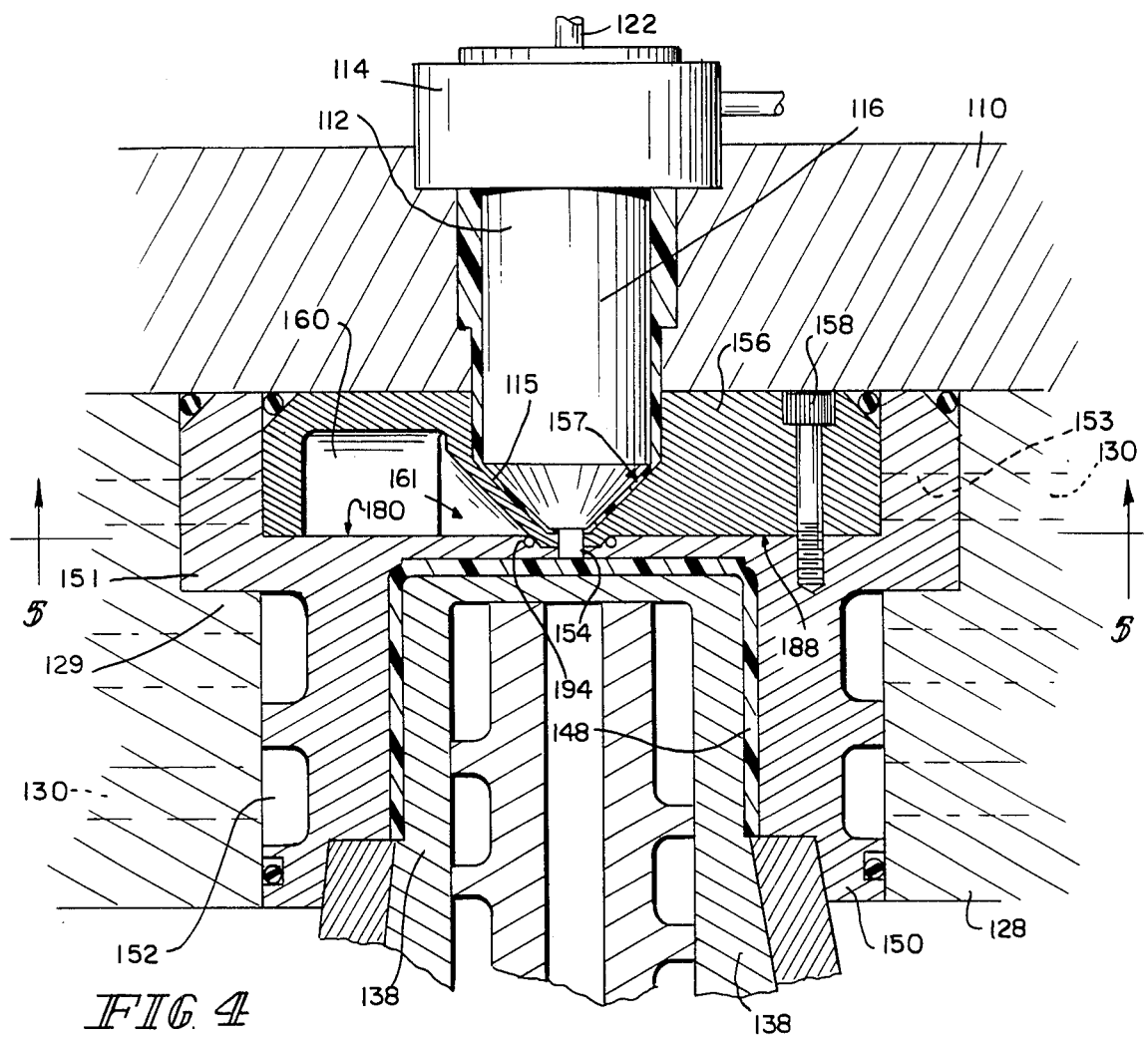
FIG. 4 is a sectional view similar to FIG. 1 of an alternative embodiment of the invention.
Figure 5:
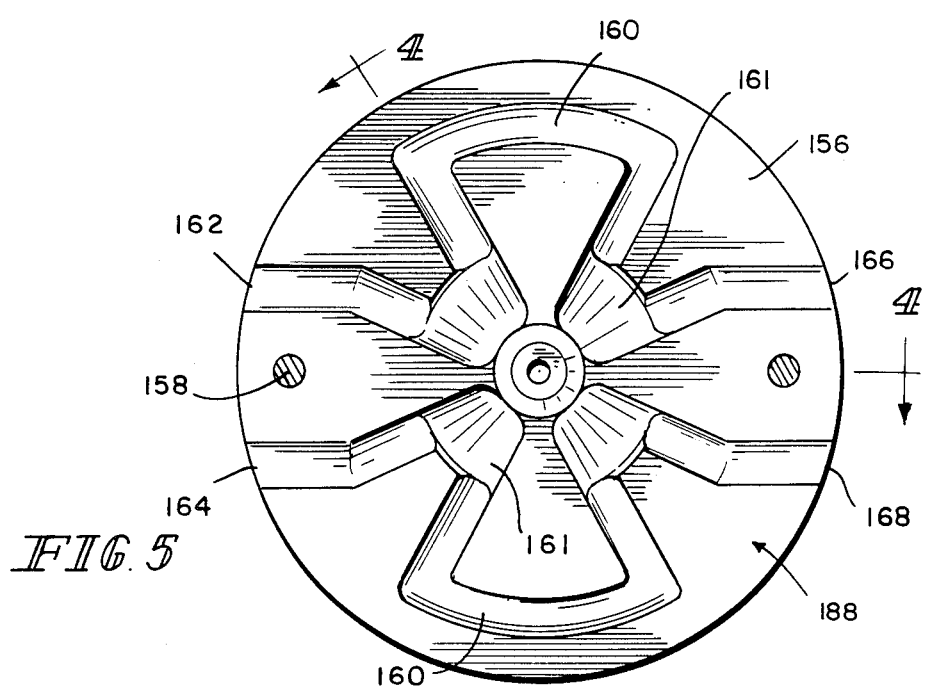
FIG. 5 is a bottom plan view of the cap shown in FIG. 4 as viewed along lines 5—5.

The sectional view shown in FIG. 1 is taken along lines 1—1 of FIG. 2 while the sectional view shown in FIG. 4 is taken along lines 4—4 of FIG. 5.

FIG. 1 shows a member 10 which is a stationary platen, clamp plate, or mold base support of an injection molding machine. A nozzle 12 from a plasticating and injection unit or other source of molten plastic projects through plate 10. The nozzle 12 may be coupled directly to the plasticating and injection unit (not shown) or may be a portion of a hot manifold distributing system. The nozzle 12 includes a nozzle housing 14, a heated jacket 16 including a heater 17, and a jacket liner 18 which terminates in an opening 20. The opening 20 is closed by a reciprocating probe 22 having an end which moves between a closed position C and an open position O. The probe 22 is surrounded by the stream of melted plastic 24 received from the source (not shown).

A two-element cavity member 26, in accordance with the present invention, is received within a cavity support 28 which includes a plurality of channels 30, shown in phantom, which are connected to a source of cooled or chilled liquid such as water (not shown). The two-element cavity member 26 is retained in the cavity support 28 by fastening means such as screw members 32 securing flange 34 to a front surface 36 of cavity support 28. The two-element cavity member 26 cooperates with a core member 38 which can include a conventional fountain system 40 and stripper 42. Between an outer surface 44 of core member 38 and an inner surface 46 of cavity member 26 is a space 47 into which the melted plastic 24 is injected to form a molded article 48 of predetermined size and shape.

The two-element cavity member 26 of the present invention includes a first element 50 which incorporates the molding surface 46 and mounting flange 34. The first cavity element also includes channels 52 separated by flanges 53, the channels 52 connecting with the channels 30 to permit circulation of the cooling liquid against the outer surface of element 50. The element 50 further includes gate 54 which is shown to be closed by probe 22. When probe 22 retracts to its open position O, the melted plastic 24 enters the space between surfaces 44 and 46 through gate 54 to form the molded article 48.

The two-element cavity member 26 also includes a second element 56 which forms a cap on the end of cavity element 50 opposite the core member 38. The cap 56 is secured to the cavity element 50 by an appropriate fastening means 58. The cap 56 includes channels 60 connected to the conduits 30, the channels 60 directing cooled liquid between the nozzle 12 and the first cavity element 50.

Figure 3:
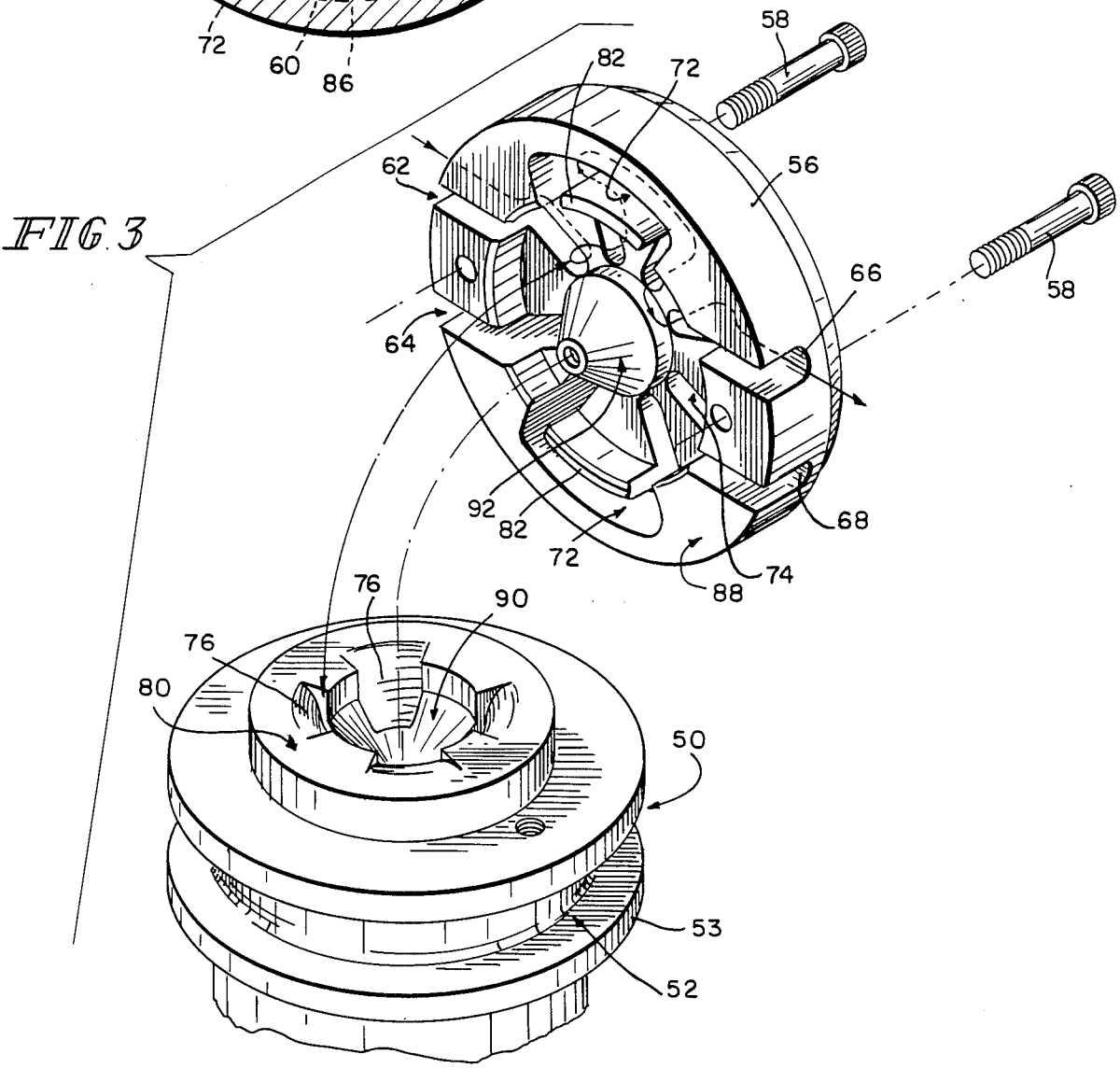
FIG. 3 is an exploded view of the two elements forming the cavity member shown in FIGS. 1 and 2.

The channels 60 in cap member 56 are shown in more detail in FIGS. 2 and 3 to consist of two tortuous paths beginning at 62 and 64 and ending at 66 and 68, respectively. Each of the two paths 62–66 and 64–68 are shown to comprise an initial segment 70 which is slightly angular in shape, an intermediate section 72 which is generally U-shaped, and a terminal section 74 similar to section 70. The sections 70 and 72, as well as sections 72 and 74, are joined by pockets 76 and 78, respectively, which are formed into end 80 of the first cavity element 50. The cap 56 includes lands 82 which abut the first element 50 so as to support the bottom 82 of molding surface 46.

As shown in FIG. 2, the pockets 76 and 78 are situated wholly within the maximum diameter of surface 46 as shown by dotted line 84. Further, the pockets 76 and 78 extend inside the maximum diameter of heated jacket 16 of nozzle 12 which is shown by dotted line 86. Except for the channels 60 including the connecting pockets 76 and 78, the surface 80 of the first element 50 is contiguous to surface 88 of second element 56. The innermost conical surfaces 90 and 92 are also contiguous broken only by O-ring 94 shown in FIG. 1 which functions to prevent water from pockets 76 and 78 from entering the mold area by way of gate 54. Additional O-rings 96 and 98 are provided on the outer perimeter of the mold to prevent cooling water from channels 30, 52, and 60 from leaking between the mold member 26 and mold support 28.

While in the embodiment shown in FIGS. 1-3 the tortuous path of channel 60 includes pockets 76 and 78 formed in end 80 of first element 50, another embodiment of the invention shown in FIGS. 4 and 5 confines the channels designated 160 to be wholly within the cap 156. FIG. 4 shows a heated nozzle 112 similar to that shown in FIG. 1 having a reciprocating probe 122 interacting with gate 154 and mold element 150. The mold element 150 is similar to element 50 shown in FIG. 1 but includes a perimetral flange 151 which is capture behind step 129 of mold support 128. The perimetral flange 151 includes apertures 153 which cooperate with conduits 130 to direct cooling liquid into channels 160. Additional cooling channels 152 are provided similar to that shown in FIG. 1.

The cap 156 is enclosed by the perimetral flange 151 and secured in place by an appropriate fastening means 158. The front surface 188 abuts surface 180 of mold element 150. The surface 180 is shown to be substantially planar except in the immediate vicinity of the gate 154 where an O-ring 194 is provided. The planar surface 188 of cap 156 is shown in greater detail in FIG. 5 to include two continuous channels 160 beginning at 162 and 164 and terminating at 166 and 168, respectively. The two channels 160 are shown to include wedge-like portions 161 which project inside the maximum diameter of the heated nozzle 112 to thereby provide a reduced transmission of heat from the heated nozzle 112 to the molded article 148 formed between the cavity element 150 and core element 138 as well as cooling of article 148.

In both illustrated embodiments, additional thermal isolation is achieved between the nozzle assembly 12, 112 and the adjacent molded article 48, 148 by providing a space 15, 115 between the outer surface on the heated jacket 16, 116 and surface 57, 157 of cap 56, 156. This space, 15, 115 provides a thermal break decreasing the heat transmission between the heated nozzle 12, 112 and the molded article 48, 148. Heat transmission is further reduced across the break 15, 115 by allowing plastic material from the melt 24 to enter the space 15 upon initiation of a series of molding cycles. The plastic and in particular PET exhibits a very low thermal conductivity, typically much less than 1 W/m°C. The thickness of space 15 and hence of the layer of intervening plastic can be regulated by selecting and positioning nozzle housing 14, 114 in respect to plate 10, 110.

The insulation provided by the layer of plastic in thermal break 15, 115, the lowered thermal conductivity provided by the appropriate selection of material to form cap 56, 156, and the intruding pockets 76, 78 and wedges 176 act in concert to thermally isolate the molded article 48, 148 from the heated nozzle 12, 112 and thereby permit the cycle times to be significantly reduced.

Although the invention has been described in detail with reference to certain preferred embodiments, variations and modifications exist within the scope and spirit of the invention as described and as defined in the following claims.

We claim:

1. An injection molding machine having first and second mold members, the second member being movable with respect to the first, the first and second mold members cooperating to define a space into which molten plastic is injected to form an article of predetermined shape, a source of molten plastic including a nozzle, the first mold member including a gate aligned with the nozzle through which molten plastic is injected, a support member for supporting the first mold member including conduits for carrying liquid from a liquid cooling system, and a cap situated between the nozzle and first mold member having an aperture aligned with the gate, the cap having at least one tortuous channel on a surface adjacent the first mold member, the surface of the first mold member adjacent the cap including at least one pocket communicating with the at least one channel in the cap to define a liquid-conducting space connected in fluid communication with at least one of said conduits for directing cooled liquid between the nozzle and first mold member.

2. The machine of claim 1 wherein the surface of the first mold member adjacent the cap is substantially planar.

3. The machine of claim 1 wherein the first mold member includes a permimetral flange on the end adjacent the nozzle, the cap being received within the perimetral flange.

4. The machine of claim 1 wherein the maximum width dimension of the cap and first mold member are the same.

5. The machine of claim 1 wherein the surface of the cap adjacent the nozzle is dimensioned a preselected distance from the nozzle to provide a thermal break therebetween.

6. The machine of claim 5 wherein said break is filled with plastic from said source upon initiation of molding.

7. The machine of claim 1 wherein the cap is fixed to the first mold member, first mold member being fixed to said support.

8. A two-element cavity member for use in an injection molding machine having a chilled liquid cooling unit and a source of molten plastic including a nozzle adapted to introduce the molten plastic into a molding space between the cavity member and a core member movable wtih respect to the cavity member, the cavity member comprising a first element having an inside surface for cooperating with the core member to fully define said molding space and a gate through which molten plastic flows from the nozzle to said molding space, and a second element situated between the nozzle and first element in a location remote from said molding space, the second element having an aperture aligned with the gate and a surface confronting a surface of the first element to define a channel between the first and second elements for receiving liquid from the chilled liquid cooling unit.

9. The two-element cavity member of claim 8 wherein the second element consists of a material having a thermal conductivity of less than about 20 W/m°C.

10. The two-element cavity member of claim 8 wherein the second element includes an outside surface dimensioned so as to be spaced from said nozzle by a preselected distance.

11. The two-element cavity member of claim 8 wherein the channel between the first and second elements comprises a plurality of tortuous slots in the second element and a plurality of pockets in the first element connected by the tortuous slots in the second element.

12. The two-element cavity member of claim 11 wherein the pockets in the first element are situated wholly within the maximum diameter of said inside surface.

13. The two-element cavity member of claim 11 wherein the pockets in the first element extend inside the maximum diameter of said nozzle.

14. The two-element cavity member of claim 9 wherein the surface of the second element confronting the first element includes a plurality of lands abutting the first element to provide support.

15. The two-element cavity member of claim 8 wherein the second element is removably secured to the first element.

16. The two-element cavity member of claim 15 further comprising threaded fasteners for coupling the second element to the first element.

17. A cavity member for use in an injection molding machine having a source of molten plastic and a chilled liquid mold temperature control system, the cavity member comprising a cavity-defining element and a cooling cap, the cavity-defining element having an inside surface fully defining the exterior shape of an article to be molded, an aperture leading from the inside surface to the source of molten plastic, and an outside surface coupled to the chilled liquid system, the cooling cap being situated between the source of molten plastic and the cavity-defining element in a location remote from said inside surface of the cavity member, the cooling cap having a surface positioned in confronting relation to the outside surface of the cavity-defining element to define a liquid-conducting passage therebetween and coupled to the chilled liquid system to conduct the chilled liquid between the source of molten plastic and the cavity-defining element.

18. A two-element cavity member for use in an injection molding machine having a nozzle through which molten plastic is injected, the cavity member comprising a first element having an inside surface fully defining the exterior shape of an article to be molded, and a second element having an outside surface confronting the nozzle in spaced relation to define a space therebetween for receiving molten plastic discharged from the nozzle, the first and second elements cooperating to define therebetween channel means for distributing cooling liquid within an interior region of the cavity member in proximity to the nozzle.

19. The two-element cavity member of claim 18 wherein the second element is removably secured to the first element.

20. The two-element cavity member of claim 19 further comprising threaded fasteners for coupling the second element to the first element.

* * * * *

UNITED STATES PATENT AND TRADEMARK OFFICE
CERTIFICATE OF CORRECTION

PATENT NO. : 4,622,001
DATED : November 11, 1986
INVENTOR(S) : Bright et al.

It is certified that error appears in the above-identified patent and that said Letters Patent is hereby corrected as shown below:

In col. 1, line 34, delete "subseuent" insert --subsequent--.

In col. 4, line 35, delete "capture" insert --captured--.

In col. 5, line 43, delete "permimetral" insert --perimetral--.

In col. 6, line 28, delete "9" insert --8--.

Signed and Sealed this

Tenth Day of March, 1987

Attest:

DONALD J. QUIGG

Attesting Officer

Commissioner of Patents and Trademarks